United States Patent [19]
Bahl et al.

[11] 3,858,456
[45] Jan. 7, 1975

[54] CONTROL MECHANISM HAVING MEANS COMPENSATING FOR RELATIVE LIMITED MOVEMENT BETWEEN A PAIR OF RELATED STRUCTURES

[75] Inventors: James Melvin Bahl, Waterloo; Seaton Moon, Cedar Falls; Michael Keith Magruder, Waterloo, all of Iowa

[73] Assignee: Deere & Company, Moline, Ill.

[22] Filed: July 16, 1973

[21] Appl. No.: 379,891

[52] U.S. Cl. .................. 74/491, 74/470, 308/28
[51] Int. Cl. .................. G05g 1/04, F16c 35/02
[58] Field of Search .......... 74/473 R, 470, 491, 519, 74/512; 192/99 S; 308/28, 30

[56] References Cited
UNITED STATES PATENTS

| | | | |
|---|---|---|---|
| 974,502 | 11/1910 | Levalley | 308/30 |
| 2,099,594 | 11/1937 | Bloomquist | 192/99 S |
| 2,715,051 | 8/1955 | Guy | 308/28 |
| 3,073,278 | 1/1963 | Brewster | 74/491 X |
| 3,130,599 | 4/1964 | Haas | 74/513 X |
| 3,417,634 | 12/1968 | Dangauthier | 74/473 |
| 3,511,105 | 5/1970 | Matter | 74/473 X |
| 3,647,011 | 3/1972 | Baumgartner | 74/491 X |

Primary Examiner—Allan D. Herrmann

[57] ABSTRACT

In an environment wherein a pair of basic structures are interrelated for limited relative movement and wherein one structure carries a controllable part and the other carries a controlling part, the linkage and mounting means between and for the parts includes provision compensating for such relative movement in such manner that the control mechanism is not affected by such relative movement.

8 Claims, 4 Drawing Figures

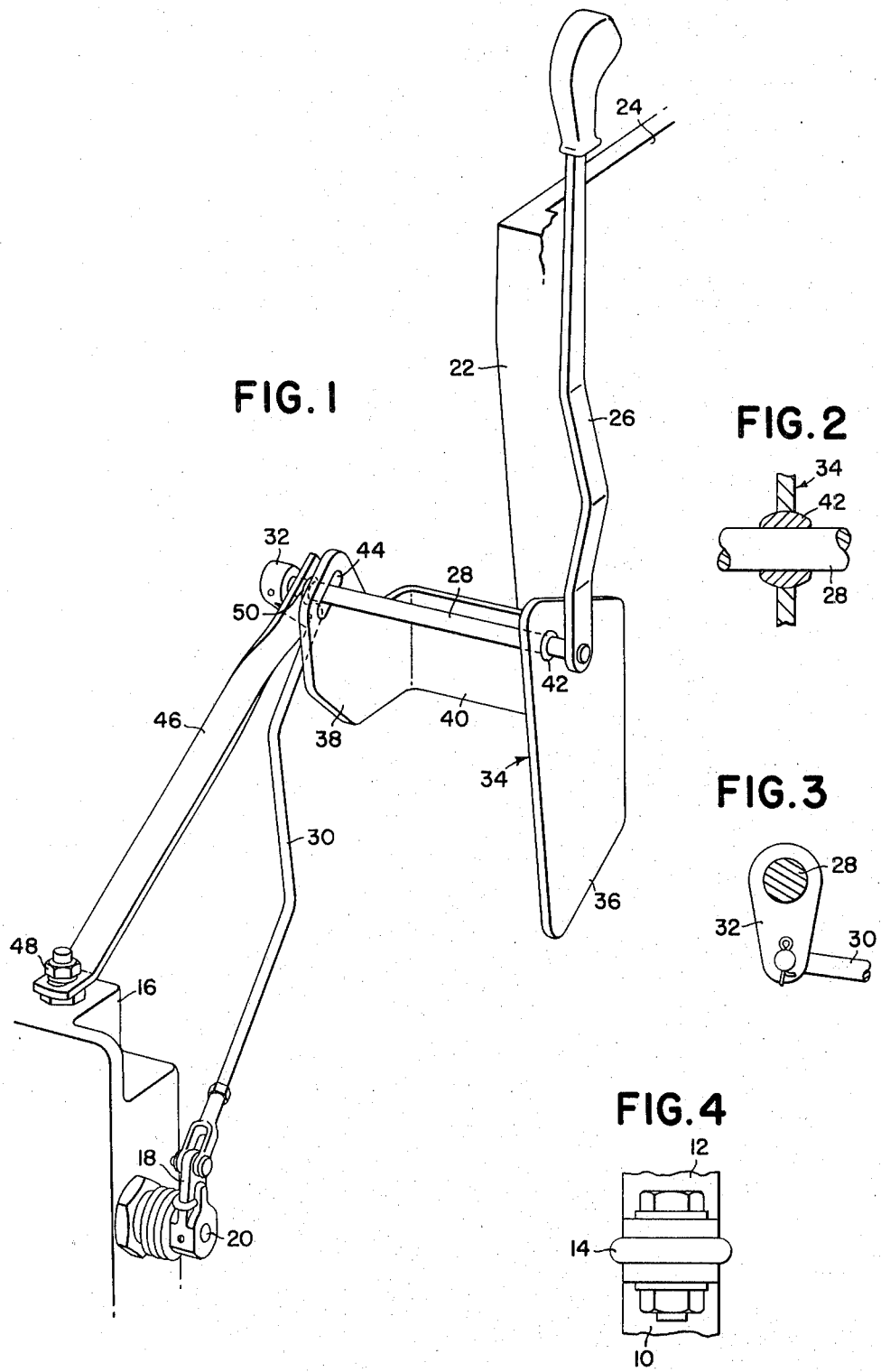

CONTROL MECHANISM HAVING MEANS COMPENSATING FOR RELATIVE LIMITED MOVEMENT BETWEEN A PAIR OF RELATED STRUCTURES

BACKGROUND OF THE INVENTION

A representative situation in which the invention finds particular utility is a typical agricultural or other tractor having a control or operator's station so mounted on the tractor chassis that the station has limited movement relative to the chassis, as by the interposition of resilient mounts for the purpose of substantially isolating the operator from chassis vibrations. An exemplary arrangement is disclosed in U.S. Pat. No. 3,656,799 issued to Malm et al on Apr. 18, 1972.

One problem that is encountered in this area revolves about the mounting on the tractor chassis of a controllable part; e.g., a valve for part of the hydraulic system, whereas, at the same time, the control part, such as a lever, must be associated with the control station. Further, the lever normally has selectively fixed positions, dependent, for example, on the selected position of an asociated implement. A simple direct connection between the lever and valve means that the valve is subject to undesirable movement as a result of relative movement of the control station and chassis, and this causes unwanted changes in the position of the implement.

An obvious solution is to mount both the valve and the lever on the chassis, but this means that the lever would vibrate with the chassis and relative to the operator. Normally, the lever is guided by a slot in a support on the control station and such vibration would prevent usage of a simple slot and resort would have to be had to other means, such as a specially constructed support carried by the chassis and "projected" into the vicinity of the operator.

Another obvious solution would be to mount the valve structure on the control station along with the lever, but this has such disadvantages as adding weight to the control station and further locating the valve structure in such relation that its hydraulic "noises" are directly transmitted to the station. These disadvantages are particularly acute when the control station is in the form of an enclosure isolated and insulated from tractor vibrations and noises, as in the aforementioned patent.

SUMMARY OF THE INVENTION

According to the present invention, the control lever remains essentially with the control station or cab and the valve structure remains with the tractor chassis. Relative movement between the chassis and cab structures is accommodated by a special and novel mounting in which the control part or lever is carried by a rockable shaft supported in part by the cab and in part by the chassis and is carried by axially spaced apart self-aligning bearings so that changes in positions of the cab and chassis resulting from the resilient mounting of the cab on the chassis does not adversely affect the position of the valve or lever even though the valve and an arm fixed to the lever are interconnected by a simple link. A further feature is that the support on the cab is in the form of a U which has one leg carrying one self-aligning bearing and which has in its other leg a slot carrying the shaft, and the slot runs generally along or parallel to the path of movement of the link as it is shifted by the lever, whereby, when the valve and lever occupy their respective fixed positions, the slot accommodates movement of the cab relative to the chassis and the lever, link and valve are not affected.

To simplify the construction, the connection from the chassis to the one bearing for the shaft is in the form of a stabilizing link or strut, also running along or in general parallelism with normal movement of the link, resulting in a simple, inexpensive arrangement.

These and other features will become apparent as a preferred embodiment is disclosed by way of example, in the ensuing description and accompanying drawing.

BRIEF DESCRIPTION OF THE DRAWING

FIG. 1 is a perspective, with portions broken away.

FIG. 2 is a section showing a representative form of shaft bearing.

FIG. 3 is a fragmentary view showing the arm on the control shaft.

FIG. 4 is a fragmentary view showing a representative chassis-to-cab mounting.

DESCRIPTION OF THE PREFERRED EMBODIMENT

As observed above, the tractor-cab arrangement is but representative. The tractor chassis is shown generally at 10 (FIG. 4) and represents a first structure. The tractor cab or control station bears the numeral 12 and represents a second structure. As also shown in FIG. 4, the two structures are interconnected (or the cab is mounted on the chassis) by means of a resilient mount 14, it being understood—especially by way of reference to the above patent—that there are several mounts of this type, whereby the cab or second structure has limited relative movement as respects the chassis as the chassis vibrates relative to the cab or as the cab assumes different positions relative to the chassis in response to changes in ground contour traversed by the tractor.

A valve housing 16 is rigidly carried by the chassis 10 and supports a controllable part, here an arm 18 fixed to the outer end of a valve shaft 20. Because the shaft 20 is rockable about its axis, the outer end of the arm 18 swings in a defined path, here arcuate and, oriented with respect to the tractor environment selected for purposes of illustration, in a fore-and-aft direction. The internal mechanism of the valve structure is not specifically important. Suffice it to say that it may be of the so-called position-responsive type, as in U.S. Pat. No. 2,974,734 issued to Kienzle on Mar. 14, 1961. That is to say, the valve is opened to cause a selected adjustment of an associated implement, after which servo linkage causes the valve to close and thus to retain the selected implement position until the valve is opened again. Also, the valve may be part of a draft-responsive system or even part of a combination of the two, all of which is illustrated in the patent mentioned immediately above.

The cab or second structure 12 includes as a rigid part thereof a "console" 22 in the upper part of which is a fore-and-aft slot 24. A control part or lever 26 projects upwardly through this slot and has its lower end fixed to a rockable cross shaft 28. Ignoring for the moment the mounting of the shaft, it will be observed that the axis of the shaft is crosswise of the fore-and-aft path of movement of the valve shaft arm 18. A simple link 30 is pivotally connected at its front end to the valve shaft arm 18 and is also pivotally connected at its rear end to a depending arm 32 fixed to the control shaft 28. The arrangement is such that, given proper support for the shaft 28, rocking of the shaft by the lever 26 causes fore-and-aft movement of the arm 18 via the link 30.

The valve housing 16, being part of the tractor chassis 10, will move with the chassis 10, and the lever 16, being "part" of the console 22, should move with the cab. As already observed, if the shaft 28 were mounted directly on the console, relative movement between the console and chassis would adversely affect the position of the valve via the link 30. To compensate for this, the invention provides a simple and novel arrangement to be described below.

The console rigidly mounts a support 34, here in the form of a U-shaped bracket having first and second legs 36 and 38 and a bight 40. The bight is affixed in any suitable manner to the console and the legs extend forwardly. The leg 36 carries a selfaligning bearing 42 of any suitable type (FIG. 2), and the leg 38 has a slot 44 through which the shaft 28 passes.

In order to stabilize and further support the shaft 28 in conjunction with the slotted leg 38, there is provided a support or stabilizing strut 46 connected at its front end at 48 to the first structure 10 via the valve housing 16 and having at its rear end a self-aligning bearing 50 similar to that at 42 (see FIG. 2). It will be clear that, were the strut 46 of sufficient size and rigidity, the slotted leg 38 could well be avoided, but the strut as depicted has several advantages, especially in conjunction with its configuration and disposition and in combination with the disposition of the slot, both of which lie generally along or in parallelism with movement of the link 30. That is to say, the slot lends vertical support to the shaft 28 and the strut spaces the outer end of the shaft at a fixed distance from the valve housing so that limited relative movement between the structures 10 and 12 cannot adversely affect the respective positions of the lever 26 and valve arm 18. Considered broadly, the link 30, strut 46 and arms 18 and 32 form a four-bar linkage.

In operation, the valve position is changed by operator movement of the lever 26 along the slot 24 in a selected amount, and the selected position of the lever is retained, usually by friction between the lever and one edge of the slot, thus determining the amount of valve opening and therefore the extent of movement of the associated implement as the servo means follows up. As the tractor vibrates relative to the cab, the position of the valve cannot change, nor can that of the lever, because the strut-mounted end of the shaft 28 is retained in proper spacing relative to the valve housing as respects the extent of the link 30. For example, even though the cab or console may shift toward or away from the valve housing, the strut keeps the outer end of the shaft 28 in fixed relation and the slot 44 allows the bracket and console to move along the length of the slot. Because of the resilient mounts—e.g., 14—the relative movement between the structures is universal. Should the console move vertically, it may do so about the bearing 50. Should the movement be along or parallel to the axis of the shaft 28, the shaft may slide axially in the bearings 42 and 50 or the strut 46 may be either self-resilient laterally or the connection at 48 may be pivotal.

We claim:

1. In combination: a first structure, a controllable member carried by said first structure for back-and-forth movement along a defined path, a second structure associated with the first structure for limited relative movement, a control shaft spaced from the controllable member and disposed crosswise of the aforesaid path, an arm fixed to the shaft, a first support mounted on the first structure and extending to the shaft adjacent to the arm, a second support fixed to the second structure and extending to the shaft relatively axially remote from the arm, a first self-aligning bearing journaling the shaft on the first support adjacent to the arm, a second self-aligning bearing journaling the shaft on the second support relatively axially remote from the arm, and link means extending between and connected at opposite ends respectively to the arm and member for transmitting motion to move the member in response to rocking of the shaft.

2. The invention defined in claim 1 in which the first support extends generally along the line of movement of the link means.

3. The invention defined in claim 1 in which the second support includes first and second legs spaced apart axially of the shaft, one leg carries the second self-aligning bearing and the second leg has a slot through which the shaft passes, said slot being generally parallel to the line of movement of the link means.

4. The invention defined in claim 3 in which the second support is in the form of a U having a bight fixed to the second structure and including the aforesaid legs as integral parts thereof.

5. The invention defined in claim 1 in which the first support extends generally along the line of movement of the link means and the second support includes a leg part extending from the second structure to the shaft adjacent to the arm and the leg part has a slot through which the shaft passes, said slot being elongated generally along the line of movement of the link means.

6. The invention defined in claim 5 in which the first support is so mounted on the first structure as to enable axial shifting of the shaft as the second structure moves relative to the first structure.

7. The invention defined in claim 1 in which the first support is so mounted on the first structure as to accommodate axial shifting of the shaft as the structures move relative to each other.

8. The invention defined in claim 1 in which the shaft is axially slidably carried in the bearings.

* * * * *